(12) United States Patent
Fukatsu et al.

(10) Patent No.: US 7,897,083 B2
(45) Date of Patent: Mar. 1, 2011

(54) METHOD FOR MANUFACTURING LIQUID CRYSTALLINE RESIN COMPOSITION OF REDUCED DENSITY

(75) Inventors: Hiroki Fukatsu, Shizuoka (JP);
Masayuki Sakai, Shizuoka (JP);
Kazufumi Watanabe, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 969 days.

(21) Appl. No.: 11/177,284

(22) Filed: Jul. 11, 2005

(65) Prior Publication Data

US 2006/0022378 A1  Feb. 2, 2006

(30) Foreign Application Priority Data

Jul. 28, 2004  (JP) .............................. 2004-219940

(51) Int. Cl.
*B29C 47/38* (2006.01)
(52) U.S. Cl. ............. 264/211.21; 264/211; 264/211.23; 366/76.1; 366/76.6; 366/81; 366/82; 366/88
(58) Field of Classification Search ................ 366/76.1, 366/76.6, 81, 82, 88, 90; 264/211, 211.21, 264/211.23
See application file for complete search history.

(56) References Cited

U.S. PATENT DOCUMENTS 6,384,128 B1 * 5/2002 Wadahara et al. ........... 524/496
6,428,728 B1 * 8/2002 Sakai et al. ............. 264/171.13
6,525,126 B1 * 2/2003 Hattori et al. ............... 524/449

2001/0012862 A1  8/2001 Maeda
2002/0028859 A1 * 3/2002 Maeda ........................ 523/218

(Continued)

FOREIGN PATENT DOCUMENTS

JP  A-2001-172479  6/2001

(Continued)

*Primary Examiner*—Matthew J Daniels
*Assistant Examiner*—Jacob Thomas Minskey
(74) *Attorney, Agent, or Firm*—Buchanan Ingersoll & Rooney PC

(57) ABSTRACT

The object is to provide a method for manufacturing liquid crystalline resin composition having a hollow filler and a fibrous filler using a common melting-kneading extruder to maintain well-balanced relation between the residual percentages of hollow filler and the fiber length, which balance could not be attained in the prior art. A liquid crystalline resin composition having 5 to 30% by weight of hollow filler and 5 to 30% by weight of fibrous filler is manufactured using a melting-kneading extruder provided with a screw. (1) The liquid crystalline resin is fed from a main feed port located at upstream side in the extruding direction, while a hollow filler and a fibrous filler are fed from a side feed port located at downstream side in the extruding direction. The manufacture is conducted under the specific conditions between (2) L1 as the ratio L/D in which D is the screw diameter and L is the distance between the position of the side feed port and the position where the internal pressure of the extruder reaches 0.1 MPa; (3) L2 as the ratio L/D in which D is the screw diameter and L is the length of maintaining the internal pressure of the extruder at or above 0.1 MPa after feeding the hollow filler and the fibrous filler; and
(4) La as the ratio L/D in which D is the screw diameter and L is the length of the resin plasticizing zone.

9 Claims, 1 Drawing Sheet

U.S. PATENT DOCUMENTS

2002/0093118 A1* 7/2002 Inoue et al. ............ 264/211.23
2002/0141282 A1* 10/2002 Tanaka et al. ............. 366/76.1

FOREIGN PATENT DOCUMENTS

| JP | 2001-310323 | 11/2001 |
| JP | A-2001-310323 | 11/2001 |
| JP | A-2004-27021 | 1/2004 |
| WO | 2004/000529 A1 | 12/2003 |

* cited by examiner

US 7,897,083 B2

METHOD FOR MANUFACTURING LIQUID CRYSTALLINE RESIN COMPOSITION OF REDUCED DENSITY

TECHNICAL FIELD

The present invention relates to a method for manufacturing a liquid crystalline resin composition comprising a hollow filler and a fibrous filler.

BACKGROUND ART

Increasing applications of various thermoplastic resins enhances the request to decrease specific density (specific gravity) of resin materials in view of cost reduction, weight reduction, response rate improvement, and other properties. Under the situation, there are provided methods to decrease the specific density of resin by introducing air or inert gas into the resin. In particular, a technology of compounding a hollow filler in the resin has become a common practice. Also to liquid crystalline resins, the technology of compounding a hollow filler therewith has been provided (JP-A 2001-172479). The technology has an additional effect of decreasing the permittivity, as well as decreasing the specific density, thereby further widening the application field of the liquid crystalline resins (JP-A 2004-27021).

However, if the technology proposed in the related art is applied to compound a hollow filler with a resin using common melt processing extrusion process, large percentage of hollow filler may be broken owing to the shearing force of melting-kneading, thus the technology is substantially difficult to attain a composition of low specific density.

Although a hollow filler has a certain level of pressure resistance, excess pressure readily breaks the hollow filler to fail in attaining a desired effect (decreased specific density) which is a target of compounding the hollow filler with the resin. Normally break of hollow filler to some extent is unavoidable owing to the stress history during the manufacturing process. Since the residual percentages of hollow filler in the resin composition, however, significantly affect the decrease in the specific density of the composition, it is desirable to control the manufacturing conditions to maintain a high residual percentage of hollow filler.

Dispersion of hollow filler in the resin composition gives an apparent structure containing fine bubbles therein, which deteriorates extremely the resin physical properties such as flexural strength and flexural modulus, though the specific gravity becomes small. As a result, the resin composition with dispersed hollow filler often loses the practical applicability in terms of stiffness and other properties unless a fibrous filler such as glass fiber is further added. The above-cited JP-A2001-172479 and JP-A 2004-27021 also recommend the parallel use of a fibrous filler. If, however, a fibrous filler is added, the break of hollow filler during the manufacturing process may further increase owing to the increase in the viscosity and the increase in the occasions of collision of filler.

The fibrous filler such as glass fiber is preferably dispersed in the resin composition in a length range from about 200 μm to about 700 μm, more preferably from about 300 μm to about 600 μm. The preferable range is derived based on a situation that the articles of moldings requiring decreased specific gravity, using the composition, are generally in small size and having thin thickness portions so that excessively large fiber length may often induce problems such as insufficient filling, or excessively small fiber length fails to attain sufficient stiffness. For dispersing glass fiber into the resin composition at above-described fiber lengths, it is necessary to break the glass fiber applying a certain stress thereto during the manufacturing process. The stress, however, causes the decrease in the residual percentage of the hollow filler.

Consequently, general melting-kneading process adopted in the related art is difficult to maintain a good balance between the residual percentage of hollow filler and the length of glass fiber.

To solve the problem, JP-A 2001-310323 provides a method to increase the residual percentage of hollow filler by feeding a thermoplastic resin from a main feed port located at upstream side in the extruding direction, while feeding a hollow filler from a side feed port located at downstream side in the extruding direction, (if an inorganic fiber is simultaneously used, it may be fed from either the main feed port or the side feed port). JP-A 2001-310323, however, describes only the increase in the residual percentage compared with the percentage attained from simultaneous feed of the thermoplastic resin and the hollow filler from the main feed port, and the method does not consider the influence on the physical properties. As a result, the effect of the method is not sufficient.

An ideal method to maintain a good balance between the residual percentage of hollow filler and the length of glass fiber is to feed a liquid crystalline resin from the main feed port to sufficiently plasticize it, and then to feed a glass fiber from the side feed port to fully knead them together, and finally to feed a hollow filler from a separate side feed port to disperse into the resin composition. Actual melting-kneading extruders, however, have problems of limited extruder length, and of locating plurality of side feed ports, thus the method cannot be applied to common apparatuses.

DISCLOSURE OF THE INVENTION

A purpose of the present invention is to provide a method for manufacturing a liquid crystalline resin composition containing a hollow filler and a fibrous filler, which method maintains a good balance between the residual percentage of hollow filler and the fiber length, which balance cannot be attained in the related art, with an ordinary melting-kneading extruder.

To attain the above purpose, the inventors of the present invention conducted detail study of the melting-kneading conditions and the screw design of melting-kneading extruder, and found that the manufacture under a specific melting-kneading condition and the use of a specific apparatus for the manufacture are extremely effective, thus perfected the present invention.

The present invention is a method for manufacturing a liquid crystalline resin (liquid crystalline polymer) composition comprising a liquid crystalline resin, 5 to 30% by weight of hollow filler and 5 to 30% by weight of fibrous filler, using a melting-kneading extruder provided with a screw, comprising a step of:

(1) feeding a liquid crystalline resin from a main feed port located at upstream side in the extruding direction, while feeding a hollow filler and a fibrous filler from a side feed port located at downstream side in the extruding direction, satisfying the following conditions:

$L1 > 3.5$ $4 > L2 > 9$ $La > 2$ where (2) designating L1 as the ratio L/D in which D is the screw diameter and L is the distance between the position of the side feed port and the position where the internal pressure of the extruder reaches 0.1 MPa;

(3) designating L2 as the ratio L/D in which D is the screw diameter and L is the length of maintaining the internal pressure of the extruder at or above 0.1 MPa after feeding the hollow filler and the fibrous filler; and (4) designating La as the ratio L/D in which D is the screw diameter and L is the length of the resin plasticizing zone.

DETAILED DESCRIPTION OF THE INVENTION

The present invention is described below in detail. A basic feature of the present invention is to conduct manufacture under the conditions of:

(1) feeding a liquid crystalline resin from a main feed port located at upstream side in the extruding direction, while feeding a hollow filler and a fibrous filler from a side feed port located at downstream side in the extruding direction; and (2) satisfying L1>3.5, where L1 designates the ratio L/D in which D is the screw diameter and L is the distance between the position of the side feed port and the position where the internal pressure of the extruder reaches 0.1 MPa.

If L1 is 3.5 or smaller, the fed hollow filler is subjected suddenly to a shearing force, which results in break of large percentages of the hollow filler. By providing a zone free from pressure increase after the feed point of the hollow filler, the fed hollow filler is fully mixed with the molten resin, thus the molten resin functions as a lubricant to suppress sudden pressure rise, thereby suppressing the break of hollow filler. To do this, the zone free from pressure rise requires a length L1 larger than 3.5, preferably 5<L1<10.

Furthermore, to attain favorable properties as the resin composition, the fibrous filler is required to favorably disperse in the resin composition at optimum weight average fiber lengths from 200 to 700 µm.

When that optimum weight average fiber length and the dispersion state of the fibrous filler are taken into account, the manufacture is preferably carried out under the above condition (3) further specifying 4<L2<9, more preferably 5<L2<8, where L2 designates the ratio L/D in which D is the screw diameter and L is the length of maintaining the internal pressure of the extruder at or above 0.1 MPa after feeding the hollow filler and the fibrous filler. If L2 is at or smaller than 4, sufficient kneading cannot be done, and the resin composition contains dispersed fibrous filler having a large weight average fiber length, which deteriorates the flowability and may raise problem of formability and other properties. If L2 is not shorter than 9, the length of fibrous filler becomes excessively short, and break of hollow filler increases, which is unfavorable.

The liquid crystalline resin is required to be fully melted before being kneaded with the filler because the unmelted liquid crystalline resin extremely breaks the hollow filler. To do this, the ratio La of the length of resin plasticizing zone to the screw diameter D is required to become La>2.

Melting-kneading in an extruder under the above conditions provides a resin composition which gives less break of hollow filler and which gives dispersion of fibrous filler having an optimum weight average fiber length. The screw shape for attaining the resin composition is preferably the one specified below.

The manufacture is preferably done with a screw that satisfies the following conditions, where La designates the ratio L/D in which L is the length of the resin plasticizing zone and D is the screw diameter, Lb designates the ratio L/D in which D is the screw diameter and L is the distance between the position of side feed port and the position where the kneading begins, and Lc designates the ratio L/D in which L is the length of kneading zone and D is the screw diameter.

La>2 (more preferably 2<La<6, and most preferably 3<La<6)

Lb>5 (more preferably 6<Lb<10)

4<Lc<9 (more preferably 5<Lc<8)

In addition, from the points of the break of hollow filler, the optimum weight average fiber length of the fibrous filler, and other properties, a preferable condition of melting-kneading is to keep Q/N in a range from 0.5 to 2.0, where Q designates the extruding rate (kg) per unit time of kneading, and N designates the screw rotational speed (rpm).

Referring to FIG. 1, the structure of apparatus according to the present invention is described in the following. FIG. 1 is a schematic drawing of a screw for the extruder according to the present invention.

The screw according to the present invention has a plasticizing zone where the liquid crystalline resin is plasticized, and a kneading zone where the hollow filler and the fibrous filler are dispersed in the liquid crystalline resin.

The liquid crystalline resin is fed from the main feed port 1 located at upstream side in the extruding direction. Thus fed liquid crystalline resin is fully melted within the plasticizing zone 2. Insufficiently melted state adversely affects the filler-kneading in the kneading zone 4, for example, extreme break of hollow filler and extreme break of fibrous filler, which fails to attain a resin composition that provides the desired performance. Therefore, the ratio La of the length of resin plasticizing zone to the screw diameter D is required to be La>2, preferably 2<La<6, and more preferably 3<La<6.

Both the hollow filler and the fibrous filler are fed from the side feed port 3 located at downstream side in the extruding direction. An appropriate transfer zone is required to position between the side feed port 3 and the kneading zone 4, while securing L1>3.5. If the side feed port 3 and the kneading zone 4 are excessively close with each other, the filler fed from the side feed port 3 is subjected suddenly to a shearing force on entering the extruder, and particularly a large percent of the hollow filler is broken.

To satisfy the condition of L1>3.5, it is necessary to satisfy Lb>5, preferably 6<Lb<10, where Lb designates the ratio of the distance between the side feed port and the position where the kneading begins to the screw diameter D.

In the succeeding kneading zone 4, the hollow filler and the fibrous filler are fully kneaded with the molten resin. The ratio Lc of the length of kneading zone to the screw diameter D is 4<Lc<9, preferably 5<Lc<8.

As described above, to establish 4<L2<9, preferably 5<L2<8, the ratio Lc of the length of kneading zone to the screw diameter D is required to satisfy the condition of 4<Lc<9, preferably 5<Lc<8.

Applicable melting-kneading extruder includes single screw extruder and twin screw extruder. The twin screw extruder has various types such as corotating type, counterrotating type, and incomplete-intermeshing type. A preferable type of extruder is corotating twin screw kneading extruder. The corotating type includes single flight type, double flight type, and triple flight type. The counterrotating type includes parallel screw type and conical screw type.

In the melting-kneading extruder according to the present invention, the screw at downstream portion from the feed zone at downstream side is preferably structured substantially only by a forward flight screw in the extruding direction, having no kneading zone. With the structure, the kneading of hollow filler becomes weak, thereby suppressing the break of the hollow filler. The term "forward flight screw in the extruding direction" means a flight screw which transfers the thermoplastic resin or the like in the extruding direction when the screw is rotated. An example of that type of screw is a full-flight screw. For the single screw extruder, example screws for the plasticizing zone and the kneading zone are Dulmage screw, uni-melt screw, pin screw, and barrier screw. For the twin screw extruder, example screws are kneading disk (right-kneading disk, neutral-kneading disk, and left-kneading disk), and mixing screw.

The liquid crystalline polymer according to the present invention is a melt-processing polymer which can form an optically anisotropic molten phase. Properties of the anisotropic molten phase can be determined by a common polarization test method utilizing crossed polarizers. Specifically, the determination of an isotropic molten phase can be done by observing a molten sample placed on a Leitz hot stage of a Leitz polarization microscope at ×40 magnification in a nitrogen atmosphere. The liquid crystalline polymer applicable to the present invention shows an optical anisotropy under the inspection between crossed polarizers, allowing the polarization to normally transmit even in a melted and stationary state.

Although the above-given liquid crystalline polymer is not specifically limited, an aromatic polyester or an aromatic polyester amide is preferred. A polyester which contains partially an aromatic polyester or an aromatic polyester amide in the molecular chain is also one of the preferred liquid crystalline polymers. These applicable polymers preferably give logarithmic viscosity (I.V.) of at least about 2.0 dl/g, more preferably from 2.0 to 10.0 dl/g when they are dissolved in pentafluorophenol at 60° C. by a concentration of 0.1% by weight.

Specifically preferable aromatic polyester or aromatic polyester amide as the (A) liquid crystalline polymer applicable to the present invention is an aromatic polyester or an aromatic polyester amide having at least one compound selected from the group consisting of aromatic hydroxycarboxylic acid, aromatic hydroxyamine, and aromatic diamine, as a structural ingredient.

More specifically, the aromatic polyester or the aromatic polyester amide include:
(1) a polyester consisting mainly of one or more of aromatic hydroxycarboxylic acid and a derivative thereof;
(2) a polyester consisting mainly of (a) one or more of aromatic hydroxycarboxylic acid and a derivative thereof, (b) one or more of aromatic dicarboxylic acid, alicyclic dicarboxylic acid, and a derivative thereof, and (c) one or more of aromatic diol, alicyclic diol, aliphatic diol, and a derivative thereof;
(3) a polyester amide consisting mainly of (a) one or more of aromatic hydroxycarboxylic acid and a derivative thereof, (b) one or more of aromatic hydroxyamine, aromatic diamine, and a derivative thereof, and (c) one or more of aromatic dicarboxylic acid, alicyclic dicarboxylic acid, and a derivative thereof; and
(4) a polyester amide consisting mainly of (a) one or more of aromatic hydroxycarboxylic acid and a derivative thereof, (b) one or more of aromatic hydroxylamine, aromatic diamine, and a derivative thereof, (c) one or more of aromatic dicarboxylic acid, alicyclic dicarboxylic acid, and a derivative thereof, and (d) one or more of aromatic diol, alicyclic diol, aliphatic diol, and a derivative thereof. Furthermore, a molecular weight adjuster may be added to the above structural ingredients, at need.

Examples of preferred compounds which structure the above liquid crystalline polymers applicable to the present invention are: aromatic hydroxycarboxylic acid such as p-hydroxybenzoic acid and 6-hydroxy-2-naphthoic acid; aromatic diol such as 2,6-dihydroxynaphthalene, 1,4-dihydroxynaphthalene, 4,4'-dihydroxybiphenyl, hydroquinone, resorcin, and a compound expressed by the following formulas (I) and (II); aromatic dicarboxylic acid such as terephthalic acid, isophthalic acid, 4,4'-diphenyldicarboxylic acid, 2,6-naphthalenedicarboxylic acid, and a compound expressed by the following formula (III); and aromatic amine such as p-aminophenol and p-phenylenediamine.

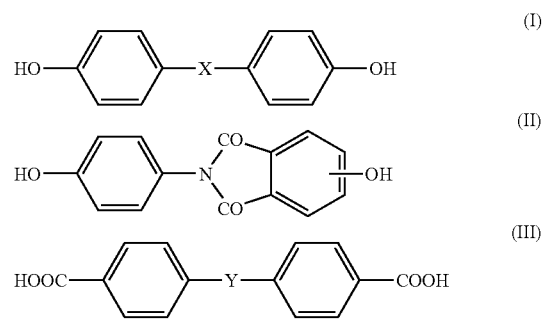

where X designates a group selected from alkylene ($C_1$-$C_4$), alkylidene, —O—, —SO—, —$SO_2$—, —S—, and —CO—, and Y designates a group selected from —$(CH_2)_n$— (n=1-4), and —$O(CH_2)_nO$— (n=1-4).

A specifically preferred liquid crystalline polymer applicable to the present invention is an aromatic polyester having p-hydroxybenzoic acid and 6-hydroxy-2-naphthoic acid as the main structural unit ingredients.

The hollow filler according to the present invention is the one generally called "balloon". Examples of the material for the hollow filler are an inorganic material such as alumina, silica, and glass, and an organic material such as urea resin and phenol resin. A mixture of two or more of these materials may be applicable, at need. As of these, glass is preferable in view of heat resistance and strength. That is, glass balloon is preferred as the hollow filler.

The mixing rate of the hollow filler is in a range from 5 to 30% by weight, preferably from 10 to 20% by weight, in the liquid crystalline composition. The mixing rate of less than 5% by weight cannot attain the desired decrease in the specific gravity. Excess rate of the hollow filler is not preferable because of the significant deterioration of flowability.

From the point of molding properties, the average particle size of hollow filler is preferably 5 μm or larger, and more preferably 10 μm or larger. From the point of suppression of break and molding properties of the composition, the average particle size thereof is preferably 500 μm or smaller, and more preferably 200 μm or smaller.

Examples of applicable fibrous filler according to the present invention are: glass fiber, asbestos fiber, silica fiber, silica-alumina fiber, alumina fiber, zirconia fiber, boron nitride fiber, silicon nitride fiber, boron fiber, potassium titanate fiber, silicate fiber such as wollastonite fiber, magnesium sulfate fiber, aluminum borate fiber, and inorganic fibrous material such as fibrous material of metal such as stainless steel, aluminum, titanium, copper, and brass. As of these, a specifically typical fibrous filler is glass fiber. High melting point organic fibrous materials such as polyamide, fluororesin, polyester resin, and acrylic resin are also applicable.

Although there is no specific limitation of the fibrous filler, generally glass fiber and carbon fiber of chopped strand having 9 to 15 μm in diameter and 1 to 10 mm in fiber length are preferably used. By adjusting the weight average fiber length thereof to a range from 200 to 700 μm within the extruder, favorable dispersion thereof in the resin composition is attained.

The mixing rate of the fibrous filler in the liquid crystalline resin composition is in a range from 5 to 30% by weight, preferably from 10 to 20% by weight. If the mixing rate is smaller than 5% by weight, the desired stiffness (10 GPa or larger of flexural modulus) cannot be attained. Excess mixing rate is not adequate because of the deterioration of flowability and the decrease in the residual percentage of hollow filler.

Regarding the liquid crystalline resin composition according to the present invention, a composition which contains additives such as nuclear agent, carbon black, pigment such as inorganic fired pigment, antioxidant, stabilizer, plasticizer, lubricator, mold-releasing agent, fire-retardant, within a content not deteriorating the effect of the present invention, thereby providing the desired respective properties is also within the scope of the liquid crystalline resin composition specified by the present invention.

BRIEF DESCRIPTION OF THE DRAWING

FIG. 1(a) shows the screw zone,
and FIG. 1(b) shows the increase in the internal pressure of the extruder. The reference symbols in the drawing is described as below.
1 . . . Main feed port
2 . . . Plasticizing zone
3 . . . Side feed port
4 . . . Kneading zone

EXAMPLES

Figure 1:
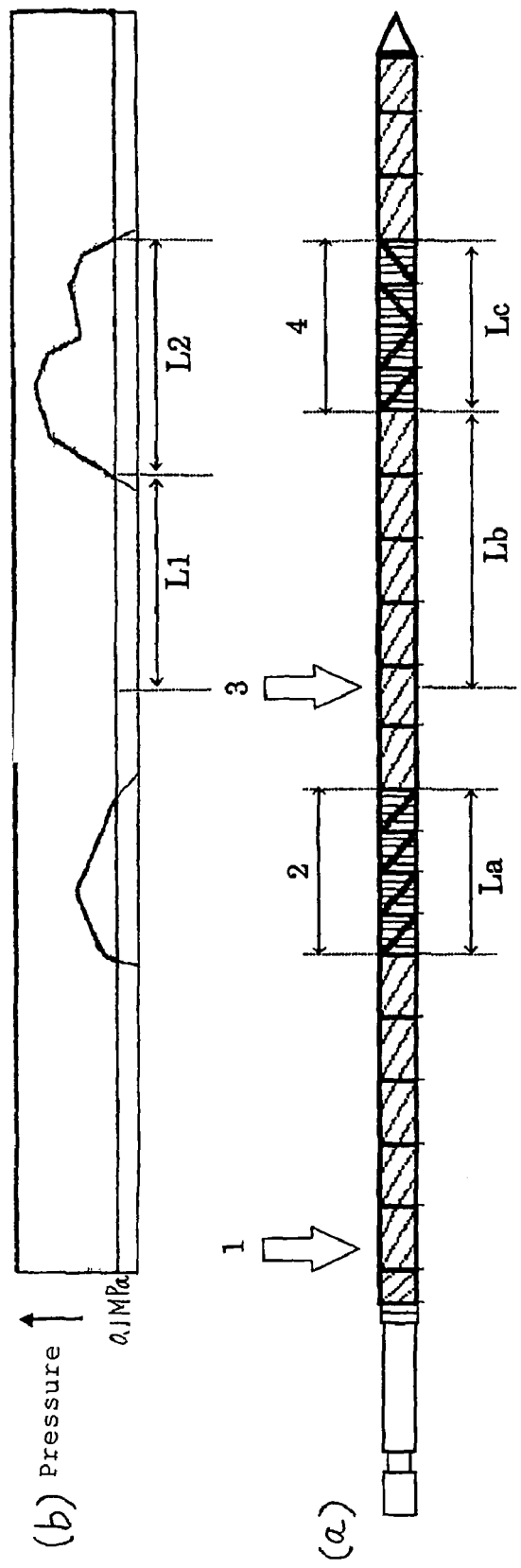
FIG. 1 is a schematic drawing of a screw for the extruder applied to the present invention.

The present invention is described in detail referring to the examples below. The present invention is, however, not limited by these examples. The physical properties given in the examples were determined by the respective methods given below. The manufacturing conditions and other conditions are also described.

[Measurement Methods]

(1) Specific Gravity

A dumb-bell specimen was prepared in accordance with ISO178 using a J75SSII-A injection molding machine (made by The Japan Steel Works, Ltd.) Thus prepared specimen was tested to determine the specific gravity at room temperature (23° C.) in accordance with ISO1183. With a separate specimen having a size of 130×12×0.8 mm, the same result was obtained.

(2) Residual Percentage of Hollow Filler

The percentage of not-broken hollow filler left in the resin was defined as the "residual percentage of hollow filler". The residual percentage of hollow filler was determined by the following formula.

$$\rho=100/[\alpha/\rho 1+\beta/\rho 2+\gamma X/\rho 3+\gamma(1-X)/\rho 4]$$

In the formula:
α: wt % of the liquid crystalline resin
β: wt % of the glass fiber
γ: wt % of the hollow filler
ρ: specific gravity of the liquid crystalline resin composition
ρ1: specific gravity of the liquid crystalline resin
ρ2: specific gravity of the glass fiber
ρ3: specific gravity of the hollow filler
ρ4: specific gravity of the material of hollow filler
X: residual percentage of the hollow filler (3) Length of Glass Fiber 5 grams of resin composition pellets were heated to 600° C. for 2 hours to ash. The ash residue was fully dispersed in an aqueous solution of 5% polyethylene glycol, and then the mixture was transferred to a Petri dish using a dropping pipette. The glass fiber in the mixture was observed using a microscope. With an image analyzer (LUZEX FS, made by NIRECO Corporation), the weight average length of the glass fiber was determined. On image-analyzing, a subroutine was applied to separate the overlaid fibers to individual ones, thereby determining the length of each fiber. The determination was done excluding the glass fibers having 50 μm or smaller length.

(4) Flexural Modulus

The determination was done in accordance with ISO178.

(5) Internal Pressure Distribution of the Extruder

Using simulation software (TEX-FAN, made by The Japan Steel Works, Ltd.) responding to the screw shape, the internal pressure distribution of the extruder was determined under the conditions of resin physical properties and the operating conditions of extruder, given below, necessary for analysis.

(Physical Properties of the Resin)
Solid density: 1390 kg/m$^3$
Melt density: 1310 kg/M$^3$
Solid thermal conductivity: 0.3 J/m·sec
Melt thermal conductivity: 0.28 J/m·sec
Solid specific heat: 880 J/kg
Melt specific heat: 1590 J/kg
Melting point: 360° C.

[Manufacturing Conditions]

(Materials to be Used)
Polymer:
Liquid crystalline polymer pellets (Vectora S950; manufactured by Polyplastics Co., Ltd.); base polymer having 355° C. of melting point and 30 Pa·s of viscosity, (determined at 380° C., 1000/s of shearing rate)
Pellet Size:
about 5 to 3 mm×about 3 to 2 mm×about 3 to 1 mm
Glass Fiber:
CS03JA419 (chopped strand having 10 μm of fiber diameter; manufactured by Asahi Fiber Glass Co.)
Hollow Filler:
S60HS (30 μm of average particle size, 0.60 of true specific gravity, and 2.50 of material specific gravity; manufactured by Sumitomo 3M Limited.)

(Extrusion Conditions)
Extruder: Twin screw extruder TEX-30α (33 mm in screw diameter, L/D=38.5; made by The Japan Steel Works, Ltd.)

Examples 1 Through 3, Comparative Examples 1 Through 3

With a screw shown in FIG. 1, having a basic structure of the main feed port (resin feed zone) 1, the plasticizing zone 2, the side feed port (filler feed zone) 3, and the kneading zone 4, the manufacture was carried out while varying the lengths La, Lb, and Lc by changing the screw element configurations.

The detail screw configurations of individual Examples and Comparative Examples are the following.

Example 1

Configuration of the plasticizing zone: from upstream to downstream, forward kneading and backward kneading; 132 mm in length Distance between the side feed port and the position where the kneading begins: 208 mm Configuration of the kneading zone: from upstream to downstream, forward kneading, backward kneading, backward flight, forward kneading, backward kneading, backward flight, forward kneading, backward kneading, and backward flight; 231 mm in length

Example 2

Configuration of the plasticizing zone: from upstream to downstream, forward kneading and backward kneading; 132 mm in length Distance between the side feed port and the position where the kneading begins: 231 mm Configuration of the kneading zone: from upstream to downstream, backmixing screw (BMS), backward kneading, and backward flight; 198 mm in length

Example 3

Configuration of the plasticizing zone: from upstream to downstream, forward kneading, and backward kneading; 132 mm in length Distance between the side feed port and the position where the kneading begins: 257 mm Configuration of the kneading zone: from upstream to downstream, backmixing screw (BMS), backward kneading, and backward flight; 198 mm in length

Comparative Example 1

Configuration of the plasticizing zone: from upstream to downstream, forward kneading and backward kneading; 132 mm in length Distance between the side feed port and the position where the kneading begins: 50 mm Configuration of the kneading zone: from upstream to downstream, forward kneading, backward kneading, backward flight, forward kneading, backward kneading, backward flight, forward kneading, backward kneading, and backward flight; 231 mm in length

Comparative Example 2

Configuration of the plasticizing zone: from upstream to downstream, forward kneading and backward kneading; 50 mm in length Distance between the side feed port and the position where the kneading begins: 208 mm Configuration of the kneading zone: from upstream to downstream, backmixing screw (BMS), backward kneading, and backward flight; 165 mm in length

Comparative Example 3

Configuration of the plasticizing zone: from upstream to downstream, forward kneading and backward kneading; 132 mm in length Distance between the side feed port and the position where the kneading begins: 330 mm Configuration of the kneading zone: from upstream to downstream, forward kneading, backward kneading, and backward flight; 50 mm in length (Extrusion Conditions)

Feeder to the main feed port 1: Loss-in-weight screw feeder (made by The Japan Steel Works, Ltd.)

Feeder to the side feed port 3:

Hollow filler: Loss-in-weight screw feeder made by The Japan Steel Works, Ltd.

Glass fiber: Loss-in-weight screw feeder made by K-TRON.

Cylinder temperature: only the cylinder at the main feed port 1 was at 200° C., and all other cylinders were at 370° C.

Extrusion rate: 30 kg/h

Screw rotational speed: 300 rpm

Mold temperature: 375° C.

(Methods for Kneading and Extruding the Composition)

With the above twin screw extruder, the pellets of liquid crystalline polymer were fed from the main feed port 1, while the hollow filler and the glass fiber were fed from the side feed port. The hollow filler and the glass fiber were fedto the side feed port using a twin screw side feeder. The composition was adjusted to 65% by weight of the liquid crystalline polymer, 15% by weight of the hollow filler, and 20% by weight of the glass fiber, (in Example 3, 60% by weight of the liquid crystalline polymer, 60% by weight of the hollow filler, and 20% by weight of the glass fiber), using a weighing feeder. The molten resin composition extruded in die-strand shape was cooled by water spray while being transferred by a mesh belt conveyer (made by Tanaka Seisakusho), followed by cutting to pellets. Specimens were obtained from thus prepared pellets using an injection molding machine under the condition given below. The specimens were tested to determine the properties. The result is given in Table 1.

(Injection Molding Conditions)

Injection molding machine: J75SSII-A, made by The Japan Steel Works, Ltd.

Cylinder temperature: 370° C.

Mold temperature: 90° C.

Injection rate: 4 m/min

Holding pressure: 49.0 MPa

Injection holding pressure time: 7 sec

Cooling time: 10 sec

TABLE 1

| | Unit | Ex. 1 | Ex. 2 | Ex. 3 | Com. Ex. 1 | Com. Ex. 2 | Com. Ex. 3 |
|---|---|---|---|---|---|---|---|
| Length of the plasticizing zone | mm | 132 | 132 | 132 | 132 | 50 | 132 |
| | La | 4.0 | 4.0 | 4.0 | 4.0 | 1.5 | 4.0 |
| Distance between the side feed port and the position where the kneading begins | mm | 208 | 231 | 257 | 50 | 208 | 330 |
| | Lb | 6.3 | 7.0 | 7.8 | 1.5 | 6.3 | 10.0 |

TABLE 1-continued

|  | Unit | Ex. 1 | Ex. 2 | Ex. 3 | Com. Ex. 1 | Com. Ex. 2 | Com. Ex. 3 |
|---|---|---|---|---|---|---|---|
| Length of the kneading zone | mm | 231 | 198 | 198 | 231 | 165 | 50 |
|  | Lc | 7.0 | 6.0 | 6.0 | 7.0 | 5.0 | 1.5 |
| Distance between the side feed port and the position where the internal pressure reaches 0.1 MPa | mm | 201 | 224 | 248 | 43 | 198 | 323 |
|  | L1 | 6.1 | 6.8 | 7.5 | 1.3 | 6.0 | 9.8 |
| Length where the internal pressure is at or higher than 0.1 MPa | mm | 238 | 205 | 208 | 238 | 208 | 56 |
|  | L2 | 7.2 | 6.2 | 6.3 | 7.2 | 6.3 | 1.7 |
| Quantity of the hollow filler | wt % | 15 | 15 | 20 | 15 | 15 | 15 |
| Quantity of the glass fiber | wt % | 20 | 20 | 20 | 20 | 20 | 20 |
| Resin temperature in the plasticizing zone | °C. | 347 | 348 | 347 | 347 | 323 | 348 |
| Residual percentage of the hollow filler | % | 70 | 75 | 67 | 26 | 17 | 76 |
| Specific gravity of the composition | — | 1.36 | 1.34 | 1.32 | 1.53 | 1.60 | 1.34 |
| Length of the glass fiber | μm | 510 | 450 | 650 | 480 | 360 | 1070 |
| Flexural modulus | GPa | 10.5 | 10.2 | 10.0 | 11.0 | 11.2 | 10.8 |
| Connector filling pressure | MPa | 130 | 130 | 155 | 115 | 110 | 170 |

The invention claimed is:

1. A method for manufacturing a liquid crystalline resin composition containing both a hollow filler and a fibrous filler that is suitable for injection molding to form an article of reduced density, said composition comprising a liquid crystalline resin, 5 to 30% by weight of hollow filler and 10 to 20% by weight of glass fibrous filler having a weight average fiber length of about 200 μm to about 700 μm, said method using a melting-kneading extruder provided with a screw, comprising a step of:

(1) feeding said liquid crystalline resin from a main feed port located at upstream side in the extruding direction, while feeding said hollow filler and said glass fibrous filler from a side feed port located at downstream side in the extruding direction;

and satisfying the conditions of:

$L1 > 3.5,$ $4 < L2 < 9,$ $2 < La < 6,$ $Lb > 5,$ and $4 < Lc < 9,$ where:

(2) L1 designates the ratio L/D in which D is the screw diameter and L is the distance between the position of the side feed port and the position where the internal pressure of the extruder reaches 0.1 MPa;

(3) L2 designates the ratio L/D in which D is the screw diameter and L is the length of maintaining the internal pressure of the extruder at or above 0.1 MPa after feeding said hollow filler and said glass fibrous filler; and (4) La designates the ratio L/D in which D is the screw diameter and L is the length of the resin plasticizing zone, (5) Lb designates the ratio L/D in which D is the screw diameter and L is the distance between the position of the side feed port and the downstream position where kneading begins, and (6) Lc designates the ratio L/D in which L is the length of the kneading zone and D is the screw diameter, and wherein at least 67% of said hollow filler that is fed from said side port and is present within the resulting liquid crystalline resin composition remains unbroken at the conclusion of said method and is present therein together with said glass fibrous filler that also was fed from said side port.

2. The method for manufacturing liquid crystalline resin composition as in claim 1, being conducted by a screw satisfying the conditions of:

$3 < La < 6,$ $6 < Lb < 10,$ and $5 < Lc < 8.$

3. The method according to claim 1, wherein said glass fibrous filler that is fed to said side feed port possesses an average fiber length of about 300 μm to about 600 μm.

4. The method according to claim 1, wherein L1 is larger than 5.

5. The method according to claim 1, wherein L1 is larger than 10.

6. The method according to claim 1, wherein said liquid crystalline resin is fully melted before being kneaded with said hollow filler and said glass fibrous filler.

7. The method according to claim 1, wherein said hollow filler is present in said composition in the range of 10 to 20% by weight.

8. The method according to claim 1, wherein the average particle size of said hollow filler is 5 μm or larger.

9. The method according to claim 1, wherein the average particle size of said hollow filler is 10 μm or larger.

* * * * *